(12) United States Patent
Kho et al.

(10) Patent No.: US 9,111,385 B2
(45) Date of Patent: Aug. 18, 2015

(54) APPARATUS AND METHOD FOR RENDERING VOLUME DATA

(71) Applicant: SAMSUNG ELECTRONICS CO., LTD., Suwon-si (KR)

(72) Inventors: Young-ihn Kho, Seoul (KR); Hee-sae Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 274 days.

(21) Appl. No.: 13/684,908

(22) Filed: Nov. 26, 2012

(65) Prior Publication Data

US 2013/0135308 A1 May 30, 2013

(30) Foreign Application Priority Data

Nov. 25, 2011 (KR) .................. 10-2011-0124390

(51) Int. Cl.
*G06T 15/08* (2011.01)
*G06T 7/00* (2006.01)
*G06T 15/06* (2011.01)

(52) U.S. Cl.
CPC ............ *G06T 15/08* (2013.01); *G06T 7/0081* (2013.01); *G06T 15/06* (2013.01); *G06T 2210/36* (2013.01)

(58) Field of Classification Search
USPC ................................... 345/424, 427
See application file for complete search history.

(56) References Cited

U.S. PATENT DOCUMENTS

| | | | | |
|---|---|---|---|---|
| 6,313,841 B1 * | 11/2001 | Ogata et al. | .................. | 345/424 |
| 6,424,344 B1 * | 7/2002 | Lee | ............... | 345/419 |
| 2002/0008887 A1 * | 1/2002 | Horikoshi et al. | ............... | 359/9 |
| 2004/0125103 A1 * | 7/2004 | Kaufman et al. | ............ | 345/419 |
| 2005/0285858 A1 * | 12/2005 | Yang et al. | ..................... | 345/420 |
| 2005/0286748 A1 * | 12/2005 | Yang et al. | ..................... | 382/128 |
| 2006/0274065 A1 * | 12/2006 | Buyanovskiy | ............... | 345/424 |
| 2007/0014480 A1 * | 1/2007 | Sirohey et al. | ............... | 382/240 |
| 2007/0247473 A1 | 10/2007 | Li | | |
| 2008/0259079 A1 * | 10/2008 | Boxman et al. | ............... | 345/424 |
| 2009/0027382 A1 * | 1/2009 | Yang et al. | ..................... | 345/419 |
| 2010/0328305 A1 | 12/2010 | Vining | | |
| 2011/0228055 A1 * | 9/2011 | Sharp | ............................. | 348/51 |
| 2012/0134560 A1 * | 5/2012 | McKenzie et al. | ............ | 382/131 |

FOREIGN PATENT DOCUMENTS

| | | |
|---|---|---|
| JP | 2006-55213 A | 3/2006 |
| KR | 10-0512609 B1 | 8/2005 |
| KR | 10-2010-0059682 A | 6/2010 |

* cited by examiner

*Primary Examiner* — Kee M Tung
*Assistant Examiner* — Ryan M Gray
(74) *Attorney, Agent, or Firm* — Sughrue Mion, PLLC

(57) ABSTRACT

A method renders volume data having multi-resolution. The volume data is divided into a plurality of sub-volumes according to a resolution, a sampling interval for each of the plurality of sub-volumes is determined based on resolutions of the plurality of sub-volumes, sub-volumes present in a path of a ray passing through each of pixels on a projection plane onto which the volume data is projected from one viewpoint are sampled according to the sampling intervals thereof, and a rendering value of each of the pixels on the projection plane is obtained by synthesizing a plurality of sampling values corresponding to each of the pixels from among sampling values obtained through the sampling.

18 Claims, 11 Drawing Sheets

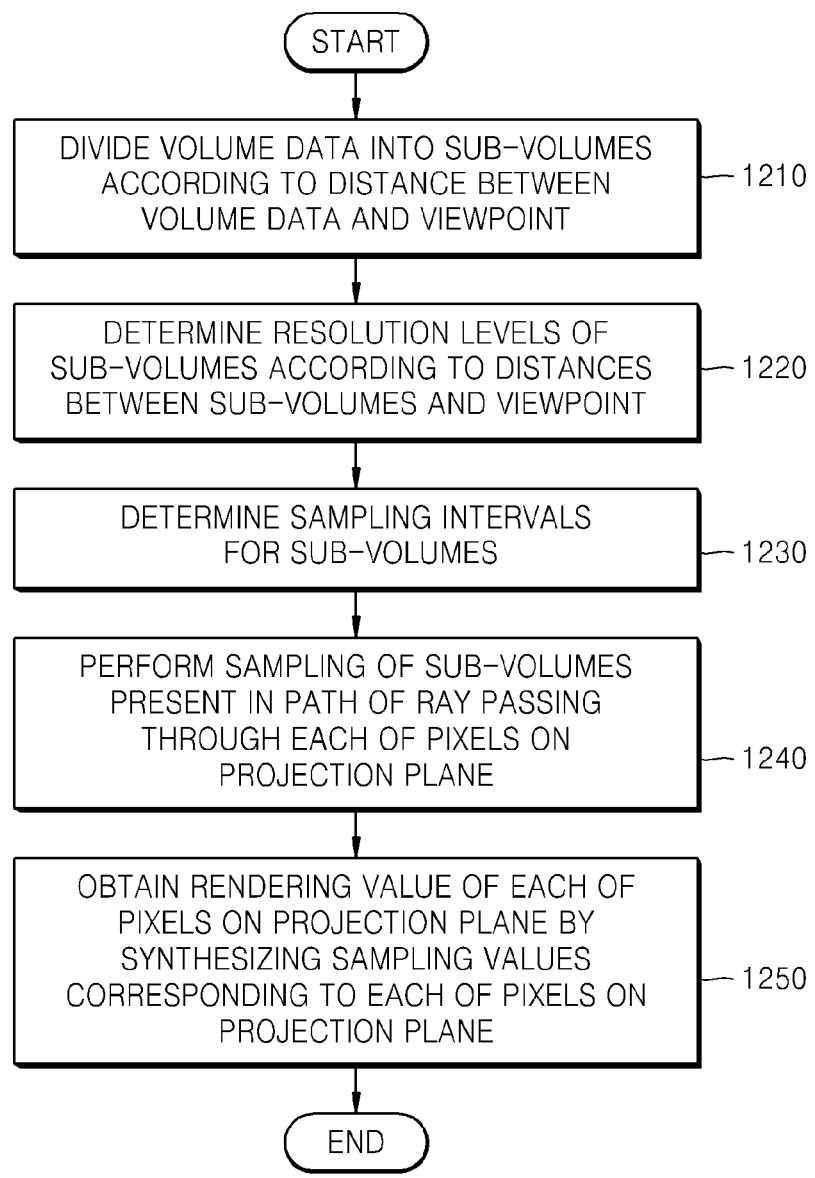

APPARATUS AND METHOD FOR RENDERING VOLUME DATA

CROSS-REFERENCE TO RELATED APPLICATION

This application claims the priority from Korean Patent Application No. 10-2011-0124390, filed on Nov. 25, 2011, in the Korean Intellectual Property Office, the disclosure of which is incorporated herein in its entirety by reference.

BACKGROUND

1. Field

Apparatuses and methods consistent with exemplary embodiments relate to rendering volume data.

2. Description of the Related Art

Volume rendering is performed to project volume data representing the volume of a three-dimensional (3D) object onto a two-dimensional (2D) screen and then display a projected resultant 2D image. It is possible to display an image visualizing the inside of a 3D object or 3D semi-transparent materials by performing volume rendering.

However, the 3D volume data may be a non-uniform volume data having multi-resolution, and the related art methods reconstruct the 3D volume data to have uniform resolution in the entire volume. Thus, a large number of calculations and a long time are needed to perform the volume rendering.

SUMMARY

Exemplary embodiments may address at least the above problems and/or disadvantages and other disadvantages not described above. Also, exemplary embodiments are not required to overcome the disadvantages described above, and an exemplary embodiment may not overcome any of the problems described above.

One or more exemplary embodiments provide methods and apparatuses for performing volume rendering on volume data having multi-resolution.

One or more exemplary embodiments provide a computer-readable recording medium having recorded thereon a computer program for performing the methods.

According to an aspect of an exemplary embodiment, there is provided a rendering apparatus which renders volume data having multi-resolution, the rendering apparatus including a divider for dividing the volume data into a plurality of sub-volumes according to a resolution; a determiner for determining a sampling interval for each of the plurality of sub-volumes, based on resolutions of the plurality of sub-volumes; a sampler for respectively sampling sub-volumes present in a path of a ray passing through a pixel on a projection plane onto which the volume data is projected from one viewpoint, according to the determined sampling intervals; and a renderer for obtaining a rendering value of each of the pixels on the projection plane by synthesizing a plurality of sampling values corresponding to each of the pixels on the projection plane from among sampling values obtained through the sampling.

According to an aspect of another exemplary embodiment, there is provided a rendering apparatus which renders volume data, the rendering apparatus including a divider for dividing volume data into a plurality of sub-volumes according to a distance between the volume data and a viewpoint; a first determiner for respectively determining resolution levels of the plurality of sub-volumes according to distances between the plurality of sub-volumes and a viewpoint; a second determiner for determining a sampling interval for each of the plurality of sub-volumes, based on the resolution levels; a sampler for respectively sampling sub-volumes present in a path of a ray passing through a pixel on a projection plane onto which the volume data is projected from the viewpoint, according to the sampling interval for each of the plurality of sub-volumes; and a renderer for obtaining a rendering value of each of the pixels on the projection plane by synthesizing a plurality of sampling values corresponding to each of the pixels on the projection plane from among sampling values obtained through the sampling.

According to an aspect of another exemplary embodiment, there is provided a method of rendering volume data having multi-resolution, the method including dividing the volume data into a plurality of sub-volumes according to a resolution; determining a sampling interval for each of the plurality of sub-volumes, based on resolutions of the plurality of sub-volumes; and respectively sampling sub-volumes present in a path of a ray passing through a pixel on a projection plane onto which the volume data is projected from one viewpoint, according to the determined sampling intervals.

According to an aspect of another exemplary embodiment, there is provided a method of rendering volume data, the method including dividing volume data into a plurality of sub-volumes according to a distance between the volume data and a viewpoint; respectively determining resolution levels of the plurality of sub-volumes according to distances between the plurality of sub-volumes and a viewpoint; determining a sampling interval for each of the plurality of sub-volumes, based on the resolution levels; and respectively sampling sub-volumes present in a path of a ray passing through a pixel on a projection plane onto which the volume data is projected from the viewpoint, according to the sampling interval for each of the plurality of sub-volumes.

According to an aspect of another exemplary embodiment, there is provided a computer-readable recording medium which stores a computer program for performing the methods.

BRIEF DESCRIPTION OF THE DRAWINGS

The above and/or other aspects will become more apparent by describing certain exemplary embodiments, with reference to the accompanying drawings, in which:

FIG. 12 is a flowchart illustrating a method of performing volume rendering on volume data, performed by a volume rendering apparatus, according to an exemplary embodiment.

DETAILED DESCRIPTION

Figure 1:
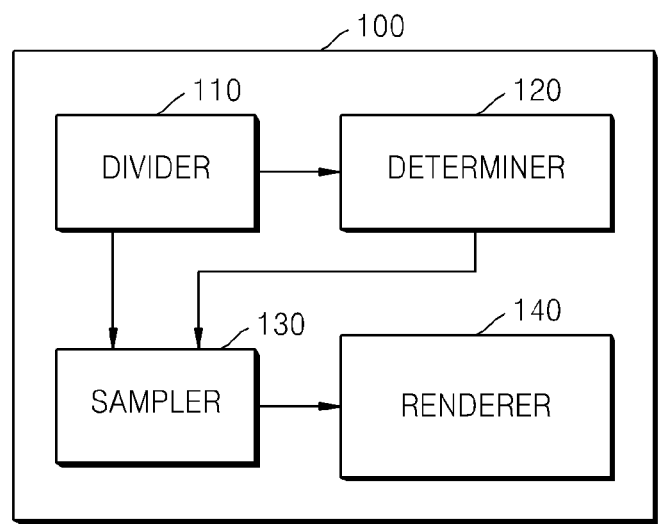
FIG. 1 is a block diagram of a volume rendering apparatus according to an exemplary embodiment.

Certain exemplary embodiments are described in greater detail below with reference to the accompanying drawings.

In the following description, the same drawing reference numerals are used for the same elements even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure exemplary embodiments with unnecessary detail.

FIG. 1 is a block diagram of a volume rendering apparatus 100 according to an exemplary embodiment. Referring to FIG. 1, the volume rendering apparatus 100 may include a divider 110, a determiner 120, a sampler 130, and a renderer 140.

For convenience of explanation, only elements of the volume rendering apparatus 100 that are related to the current exemplary embodiment are illustrated in FIG. 1. However, the volume rendering apparatus 100 may further include other elements. For example, the volume rendering apparatus 100 may include an image processor which performs image processes to form an image and a display which displays the image.

The volume rendering apparatus 100 may be at least one processor or may include at least one processor. Thus, the volume rendering apparatus 100 may be included in a general computer system (not shown) and be driven in the general computer system.

The divider 110 divides volume data into a plurality of sub-volumes according to resolution. Here, the volume data represents the volume of an object that occupies in a 3D space. The volume rendering apparatus 100 may perform volume rendering on volume data having multi-resolution.

The volume data having multi-resolution may be the volume data, which has different resolution for the overall volume, and may be referred to as non-uniform volume data. The non-uniform volume data will be described in detail with reference to FIGS. 3 and 4 below.

Thus, the divider 110 divides the volume data having non-uniform resolution into a plurality of sub-volumes according to resolution. For example, the divider 110 may divide the entire volume data into a plurality of sub-volumes according to resolution by grouping pieces or portions of the volume data, the resolutions of which fall within a predetermined range of resolution, as one sub-volume.

According to an exemplary embodiment, the divider 110 may divide resolutions of the volume data into a plurality of resolution levels based on a predetermined criterion, and divide the volume data into a plurality of sub-volumes each having the same resolution level. Thus, although the entire volume data has non-uniform resolution, volume data in each of the sub-volumes may have substantially the same resolution.

The volume rendering apparatus 100 may divide volume data having multi-resolution into a plurality of sub-volumes according to resolution, and perform volume rendering directly on the plurality of sub-volumes divided according to resolution.

Thus, the volume rendering apparatus 100 do not reconstruct the volume data having multi-resolution to have uniform resolution for the entire volume data. Accordingly, the volume rendering apparatus 100 may perform volume rendering fast with a small amount of calculation.

The determiner 120 determines a sampling interval for each of the sub-volumes, based on the resolutions of the sub-volumes. The sampling interval denotes a distance between sampling points on which the volume rendering apparatus 100 performs sampling.

For example, the determiner 120 may determine sampling intervals so that a higher-resolution sub-volume may have a shorter sampling interval and a lower-resolution sub-volume may have a longer sampling interval.

If a sampling interval is set to be substantially short within a specific-sized volume, then more volume data may be sampled in the volume, thereby rendering a high-quality image. However, the number of calculations to perform volume rendering may become excessively large and may take a great amount of time to perform the volume rendering.

If a sampling interval is set to be too long within the specific-sized volume, then less volume data may be sampled in the volume, thereby lowering the quality of an image. However, the number of calculations to perform volume rendering is very small, thereby the volume rendering may be performed at a high speed.

As described above, the quality of an image obtained by performing rendering and the speed of the rendering may be determined by a sampling interval for performing sampling.

In the current exemplary embodiment, a sampling interval is determined, but the present invention is not limited thereto and the number of sampling points at which sampling is performed in a predetermined-sized sub-volume may be determined to determine a sampling interval.

According to an exemplary embodiment, the determiner 120 may determine sub-volumes having the same resolution level to have the same sampling interval, based on the resolution levels obtained by the divider 110.

The volume rendering apparatus 100 may determine a sampling interval for each of the sub-volumes according to the resolutions of the sub-volumes and may render volume data according to a resolution thereof. Thus, it is possible to perform volume rendering on volume data having multi-resolution without having to reconstruct the volume data to have uniform resolution.

The determiner 120 may store the determined sampling intervals in a memory (not shown) of the volume rendering apparatus 100. The memory may be a hard disk drive (HDD), a random access memory (RAM), a flash memory, or a memory card.

The sampler 130 samples sub-volumes present in a path of a ray passing through a pixel on a projection plane onto which the volume data is projected, from one viewpoint, according to the sampling intervals determined by the determiner 120, respectively.

For example, the sampler 130 may perform the sampling according to volume ray casting which is one type of volume rendering. The volume ray casting will be described in detail with reference to FIG. 5 below.

The ray passing through each of pixels on a projection plane travels within the volume data in a predetermined path and performs sampling, thereby obtaining a sampling value. When sampling is performed, a plurality of sampling values may be obtained for each of the pixels on the projection plane.

The sampler 130 may store the sampling values in the memory of the volume rendering apparatus 100. In this case, the sampler 130 may store the plurality of sampling values corresponding to each of the pixels in a database.

The sampling values may include density values, color values, opacity, intensity of light, and so on of the volume data in the 3D space.

According to an exemplary embodiment, the determiner 120 may further determine the order and entry points of sub-volumes through which a ray sequentially passes in a path of the ray, based on locations of the sub-volumes in the entire volume data. Also, the sampler 130 may sample the volume data according to the sampling interval for each of the sub-volumes and the path of the ray, based on the determined order and entry points.

According to an exemplary embodiment, the determiner 120 may further determine sampling points in the path of the ray, based on the sampling interval for each of the sub-volumes and the locations of the sub-volumes in the entire volume data. The sampler 130 may perform sampling at the sampling points to obtain sampling values at the sampling points, respectively.

The renderer 140 obtains a rendering value of each of the pixels on the projection plane by synthesizing sampling values corresponding to each of the pixels from among the sampling values obtained by the sampler 130.

As described above, a plurality of sampling values obtained by the sampler 130 correspond to each of the pixels. The renderer 140 receives the sampling values from the sampler 130 and synthesizes the plurality of pixels corresponding to each of the pixels to obtain a rendering value for each of the pixels.

Thus, the renderer 140 may obtain the rendering values of all of the pixels on the projection plane by using the sampling values received from the sampler 130. The rendering values may be used to form a 2D image that reflects the volume data, which is 3D data.

According to an exemplary embodiment, the volume rendering apparatus 100 may directly perform volume rendering on volume data having multi-resolution without having to reconstruct the volume data, thereby rapidly producing an image visualizing the inside of a 3D object or 3D semi-transparent materials with a small amount of calculation.

Figure 2:
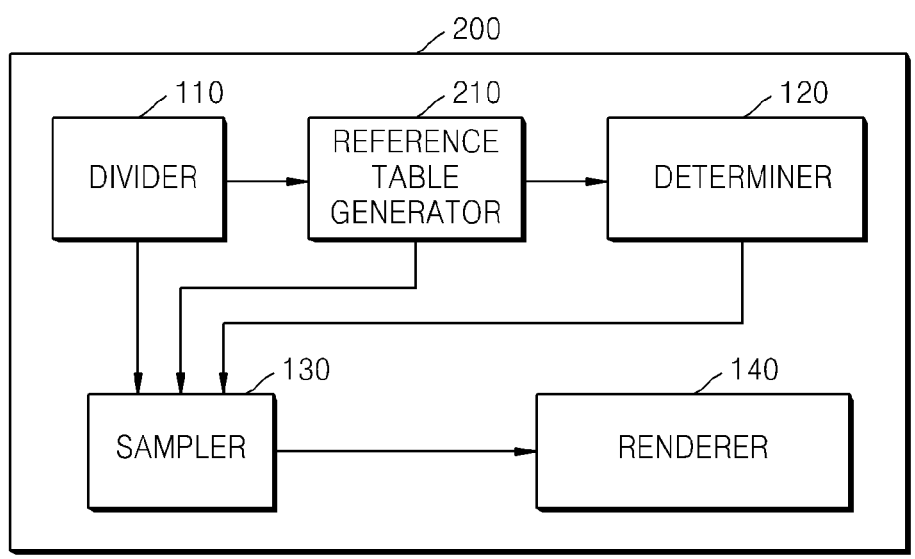
FIG. 2 is a block diagram of a volume rendering apparatus according to another exemplary embodiment.

FIG. 2 is a block diagram of a volume rendering apparatus 200 according to another exemplary embodiment. Referring to FIG. 2, the volume rendering apparatus 200 includes a divider 110, a reference table generator 210, a determiner 120, a sampler 130, and a renderer 140. The divider 110, the determiner 120, the sampler 130, and the renderer 140 illustrated in FIG. 2 correspond to the divider 110, the determiner 120, the sampler 130, and the renderer 140 of FIG. 1, respectively, and are not described in detail again. However, the elements of the volume rendering apparatus 200 are not limited to those illustrated in FIG. 2.

The divider 110 divides volume data into a plurality of sub-volumes according to a resolution, as described above with reference to FIG. 1. According to an exemplary embodiment, the divider 110 may divide the resolution of the volume data into a plurality of resolution levels according to a predetermined criterion and may divide the volume data into a plurality of sub-volumes each having the same resolution level.

Thus, volume data in each of the sub-volumes has substantially the same resolution. According to an exemplary embodiment, the entire volume data has multi-resolution, but the volume data in each of the sub-volumes may have the same or substantially the same resolution.

The reference table generator 210 produces a reference table that includes a grid structure of the volume data and the resolution levels of the sub-volumes. The reference table may be a data set including information about the grid structure of the volume data and the resolution levels of the sub-volumes. According to an exemplary embodiment, the reference table may be embodied as a data structure representing the characteristics of data and a relation between the data, but is not limited thereto.

Thus, when the divider 110 divides the volume data into a plurality of sub-volumes according to resolution, the reference table generator 210 produces a reference table including information about a grid structure of the volume data. The reference table includes information about resolution levels of the sub-volumes.

Thus, the volume rendering apparatus 200 determines a sampling interval for each of the sub-volumes and performs sampling on the volume data, based on the reference table. The reference table will be described with reference to FIGS. 6 and 7 below.

The determiner 120 determines a sampling interval for each of the sub-volumes by using the reference table. According to an exemplary embodiment, the determiner 120 determines sampling intervals so that sub-volumes having the same resolution level may have the same sampling interval, so that volume rendering may be performed on the sub-volumes based on the resolution levels of the sub-volumes.

For example, volume rendering may be performed so that a higher-resolution sub-volume may have a shorter sampling interval and a lower-resolution sub-volume may have a longer sampling interval.

Also, the determiner 120 may further determine an entry point of each of the sub-volumes according to a path of a ray, the order of the sub-volumes to be sampled, and sampling points, based on the reference table.

According to an exemplary embodiment, the volume rendering apparatus 200 may perform volume rendering according to volume ray casting. Thus, the determiner 120 may further determine an entry point of each of the sub-volumes according to the path of a ray, based on the reference table. The sampler 130 performs sampling on the sub-volumes present in the path of the ray according to the sampling intervals thereof, based on the reference table and the entry points of the sub-volumes.

Here, the entry point of each of the sub-volumes denotes a point where the ray first enters a sub-volume to be sampled.

The determiner 120 may further determine the order of the sub-volumes to be sampled according to the path of a ray, based on the reference table. Thus, the sampler 130 performs sampling on the sub-volumes present in the path of the ray at the sampling intervals thereof, according to the order determined by using the reference table.

The order of the sub-volumes to be rendered denotes an order of the sub-volumes through which the ray sequentially passes in the path of the ray.

The determiner 120 may further determine sampling points according to the path of the ray, based on the reference table and the sampling interval for each of the sub-volumes. Thus, the sampler 130 may perform sampling on the sub-volumes present in the path of the ray, at the determined sampling points.

In this case, the ray passes through the sub-volumes and performs sampling on the sub-volumes at the sampling points according to the sampling intervals for the sub-volumes. The sampling points denote points at which sampling is performed by the volume rendering apparatus 200 and are respectively disposed apart at a predetermined interval in the path of the ray starting from the entry points at which the ray enters the sub-volumes. The predetermined interval may be determined according to the sampling interval determined for each of the sub-volumes.

The determiner 120 may determine a method to perform sampling on volume data for volume rendering, based on the reference table. The determiner 120 may further determine a direction vector indicating a direction in which the ray advances within the volume data and the like.

The sampler 130 performs sampling on sub-volumes present in the path of the ray passing through each of the pixels on the projection plane onto which the volume data is projected, from one viewpoint, according to the sampling intervals for each of the sub-volumes determined by the determiner 120, as described above with reference to FIG. 1.

Also, the sampler 130 may render the sub-volumes according to the sampling intervals thereof, based on the entry points of the sub-volumes, the order of the sub-volumes to be sampled, and the sampling points determined by the determiner 120, as described above.

The sampler 130 obtains sampling values by sampling the sub-volumes according to the ray passing through each of the pixels on the projection plane. The sampling values may include density values, color values, opacity, and intensity of light of the volume data in the 3D space.

The sampler 130 stores sampling values corresponding to each of pixels in a memory (not shown) from among the sampling values obtained through the sampling.

The renderer 140 obtains a rendering value of each of the pixels on the projection plane by synthesizing the sampling values corresponding to each of the pixels on the projection plane from among the sampling values obtained by the sampler 130. In other words, the renderer 140 synthesizes a plurality of sampling values corresponding to each of the pixels to obtain a rendering value for each of the pixels.

According to an exemplary embodiment, the volume rendering apparatus 200 may directly render volume data having multi-resolution by using the reference table without having to reconstruct the volume data to have the same resolution. Specifically, the volume rendering apparatus 200 may perform volume rendering by applying a different sampling interval according to a resolution. Thus, it is possible to prevent an increase in the number of calculations for the rendering, a decrease in a speed of the rendering and degradation in image quality, which is caused when the volume data is reconstructed to have the overall uniform resolution.

Accordingly, the volume rendering apparatus 200 according to an exemplary embodiment may produce a high-quality rendered image that visualizes the inside of a 3D object or 3D semi-transparent materials at high speeds with a small amount of calculation.

Figure 3:
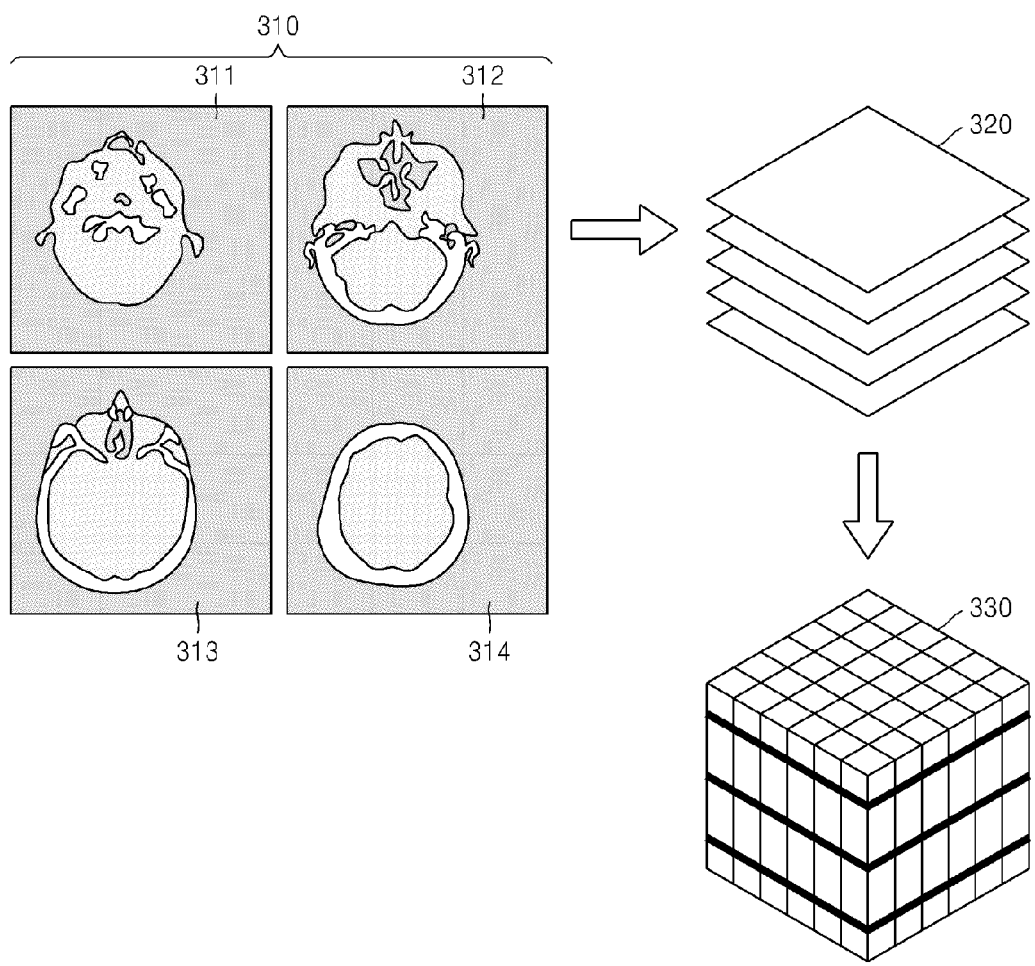
FIG. 3 is a diagram illustrating non-uniform volume data to be rendered by a volume rendering apparatus, according to an exemplary embodiment.

FIG. 3 is a diagram illustrating non-uniform volume data to be rendered by a volume rendering apparatus, according to an exemplary embodiment.

The volume rendering apparatus performs volume rendering on non-uniform volume data, i.e., volume data having multi-resolution. The volume data represents the volume of an object that occupies a 3D space. The resolution of uniform volume data is overall uniform, whereas the resolution of non-uniform volume data varies according to the location of volume data in the entire volumes thereof.

According to an exemplary embodiment, non-uniform volume data to be rendered by the volume rendering apparatus 100 may be generated during 3D visualization of tomographic images captured by a medical imaging technology, such as magnetic resonance imaging (MRI) or computed tomography (CT).

Referring to FIG. 3, 2D tomographic images 310, such as images 311, 312, 313, 314, etc., are obtained by imaging a cross section of a human tissue by using a medical imaging technology, such as MRI or CT. Then, accumulated data 320 are obtained by sequentially accumulating the tomographic images 310 in a Y-axis direction perpendicular to the cross section of the tomographic images 310. Then, 3D volume data 330 is obtained by visualizing the accumulated data 320 as 3D volumes.

During the visualization of the accumulated data 320 as 3D volumes, the 3D volume data 330 may be generated as non-uniform volume data having multi-resolution when resolutions in the Y-axis direction are lower than cross sectional resolutions of the accumulated data 320.

Figure 4:
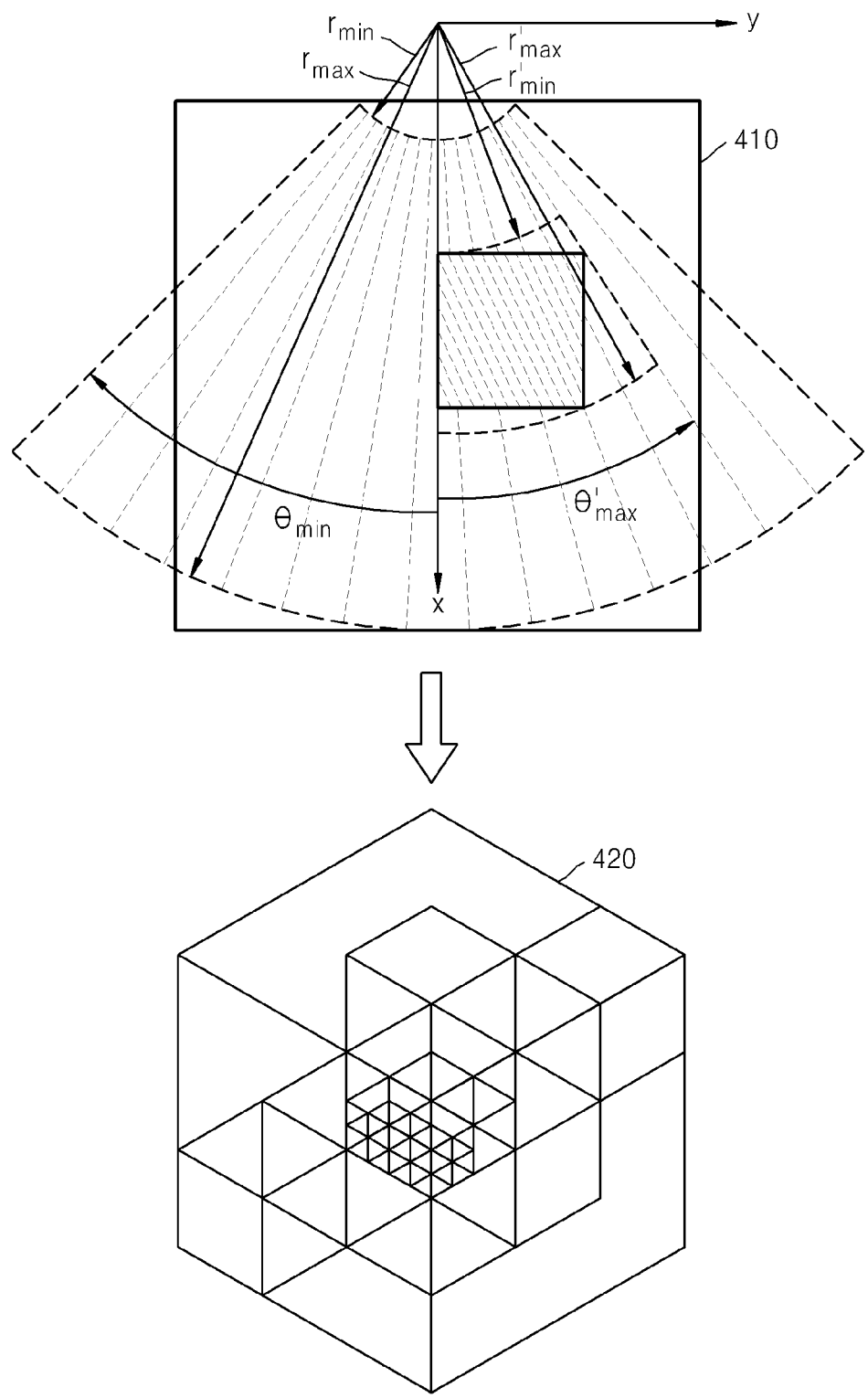
FIG. 4 is another diagram illustrating non-uniform volume data to be rendered by a volume rendering apparatus, according to another exemplary embodiment.

FIG. 4 is another diagram illustrating non-uniform volume data to be rendered by a volume rendering apparatus, according to another exemplary embodiment.

Non-uniform volume data to be rendered by the volume rendering apparatus according to an exemplary embodiment may be obtained using a beam-forming algorithm of an ultrasonic image signal. Referring to an image of 410 of FIG. 4, an ultrasonic image signal may be focused to obtain 3D volume data 420, which is non-uniform volume data having multi-resolution.

To render a 2D image onto which 3D volume data is projected by using the 3D volume data, which is non-uniform volume data having multi-resolution, the related art methods reconstruct the 3D volume data to have uniform resolution in the entire volumes. Thus, a large number of calculations and a long time are needed to perform the volume rendering.

According to an exemplary embodiment, the volume rendering apparatus 100 performs sampling on sub-volumes which are divided according to a resolution, at sampling intervals determined based on the resolutions of the sub-volumes. Thus, the volume rendering apparatus 100 may directly sample non-uniform volume data for volume rendering without having to reconstruct the volume data to have uniform resolution.

Figure 5:
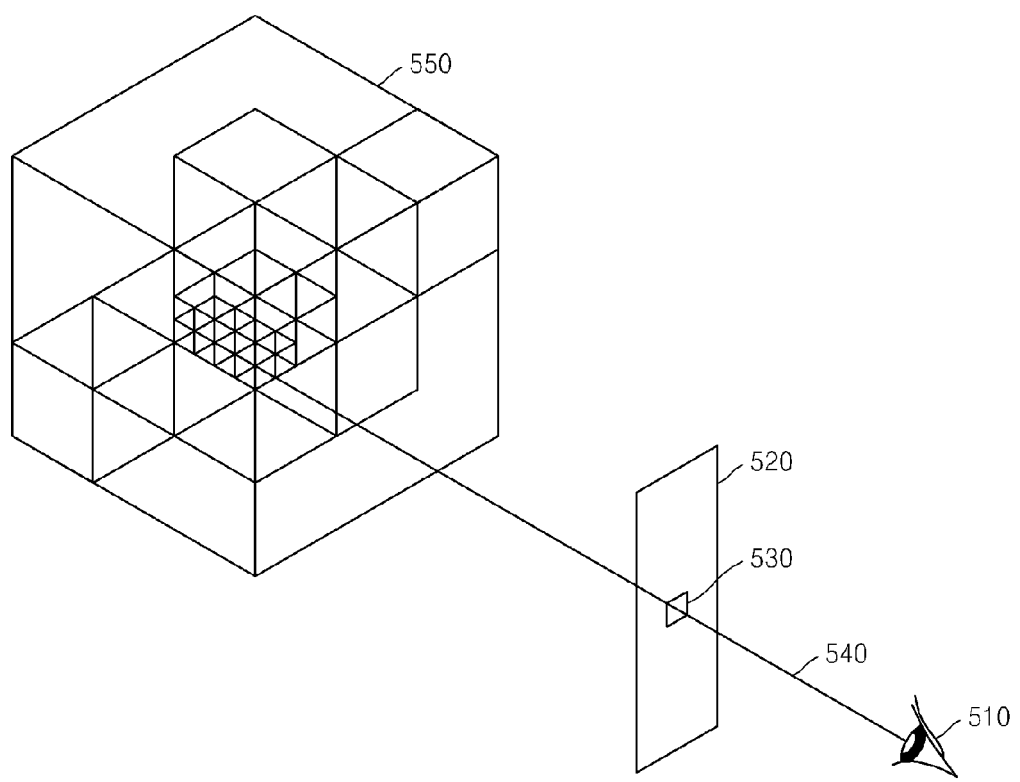
FIG. 5 is a diagram illustrating a volume rendering process performed on volume data by the volume rendering apparatus of FIG. 1 or 2, according to an exemplary embodiment.

FIG. 5 is a diagram illustrating a volume rendering process performed on volume data by the volume rendering apparatus 100 of FIG. 1 (or the volume rendering apparatus 200 of FIG. 2), according to an exemplary embodiment.

According to an exemplary embodiment, the volume rendering apparatus 100 performs volume rendering by using volume ray casting, which is a method of volume rendering. In the volume ray casting, volume data through which a ray passes in a direction of each of pixels on a projection plane from one viewpoint is sampled at predetermined sampling intervals. Then, sampling values obtained through the sampling are synthesized to produce an image obtained by projecting volume data of a 3D object onto a 2D screen.

Referring to FIG. 5, the volume rendering apparatus 100 allows a ray 540 to pass through each of pixels 530 on a projection plane 520 in a direction of each of the pixels 530 from one viewpoint 510, according to volume ray casting. The ray 540 passing through each of the pixels 530 travels within the volume of a 3D object to perform sampling at sampling points of 3D volume data 550.

The viewpoint 510 denotes a direction in which a viewer views the 3D volume data 550. The projection plane 520 onto which the 3D volume data 550 is 2D projected denotes a 2D screen on which an image obtained by performing volume rendering by the volume rendering apparatus 100 is displayed.

As described above, in the volume rendering apparatus 100, the ray 540 travels within the volume of the 3D object in the direction of each of the pixels 530 from the viewpoint 510 to perform sampling, thereby obtaining a plurality of sampling values corresponding to each of the pixels 530. The plurality of sampling values of each of the pixels 530 are synthesized to obtain a rendering value corresponding to each of the pixels 530 on the projection plane 520.

According to an exemplary embodiment, volume data to be rendered by the volume rendering apparatus 100 is the 3D volume data 550, which is non-uniform volume data having multi-resolution. Thus, in the volume rendering apparatus 100, the ray 540 passing through each of the pixels 530 on the projection plane 520 from the viewpoint 510 travels along sub-volumes divided from the 3D volume data 550 to sample the sub-volumes according to sampling intervals for the sub-volumes.

Sampling values obtained by sampling of the sub-volumes correspond to each of the pixels 530 on the projection plane 520. The volume rendering apparatus 100 synthesizes the plurality of sampling values corresponding to each of the pixels 530 to obtain a rendering value of each of the pixels 530. A 2D image onto which the 3D volume data 550 is projected may be obtained by mapping the rendering values to the corresponding pixels 530 on the projection plane 520 (2D plane).

Figure 6A:
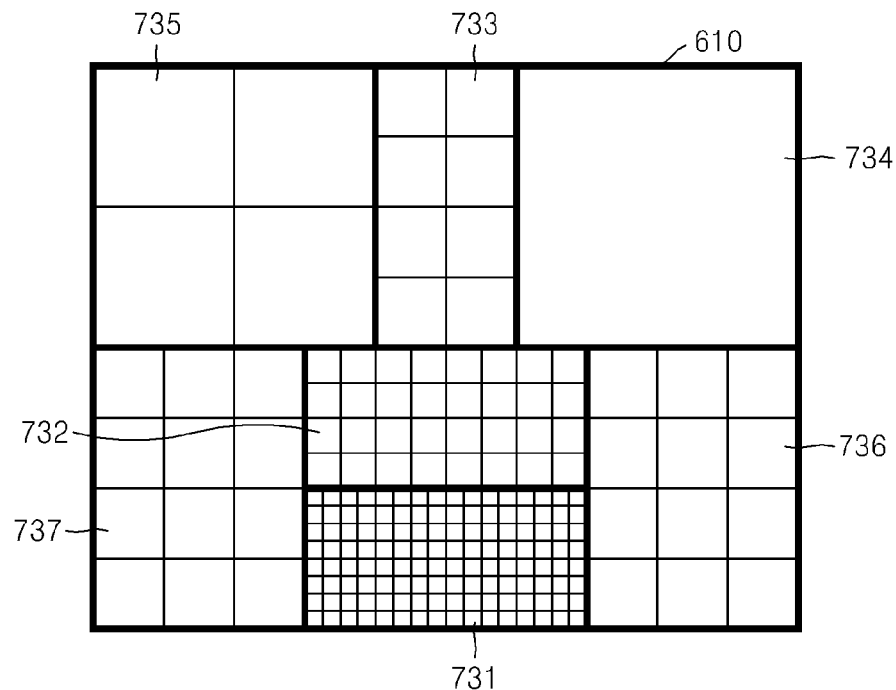
FIG. 6A is a 2D view of non-uniform volume data to be rendered by the volume rendering apparatus of FIG. 1, according to an exemplary embodiment.

FIG. 6A is a 2D view of non-uniform volume data to be rendered by the volume rendering apparatus, according to an exemplary embodiment. For example, the divider 110 may divide the resolution of volume data 610 into five resolution levels. The volume rendering apparatus 100 may divide non-uniform volume data, such as the volume data 610 of FIG. 6A, according to resolution and obtain sub-volumes 731, 732, 733, 734, 736, and 737.

Figure 6B:
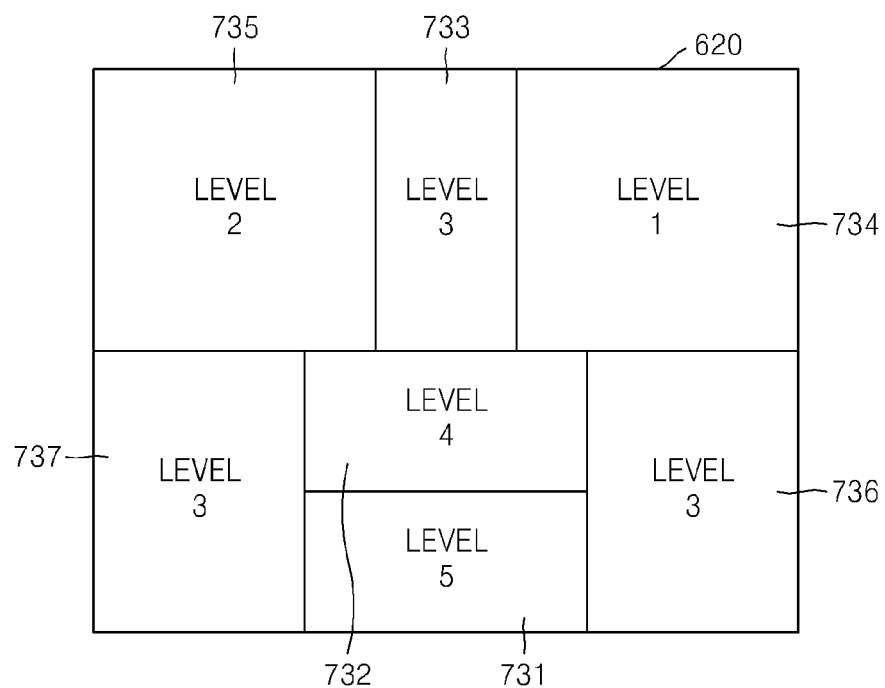
FIG. 6B is a reference table produced by the volume rendering apparatus of FIG. 2, according to an exemplary embodiment.

FIG. 6B is a reference table 620 produced by the volume rendering apparatus, according to an exemplary embodiment. FIG. 6B illustrates a plurality of sub-volumes 731, 732, 733, 734, 736, and 737 divided by the divider 110 which are classified into the resolution levels 1 through 5. In this case, volume data in each of the plurality of sub-volumes 731, 732, 733, 734, 736, and 737 has the same resolution level or is assigned the same resolution level. Thus, in the reference table 620, the sub-volume 731 corresponds to the resolution level 5, the sub-volume 732 corresponds to the resolution level 4, the sub-volumes 733, 736, and 737 correspond to the resolution level 3, the sub-volume 735 corresponds to the resolution level 2, and the sub-volume 734 corresponds to the resolution level 1.

According to an exemplary embodiment, the reference table generator 210 may receive information about a grid structure of the volume data and the resolution levels of the plurality of sub-volumes from the divider 110, and produce the reference table 620 showing the grid structure of the volume data and the resolution levels of the plurality of sub-volumes, as illustrated in FIG. 6B.

Figure 7A:
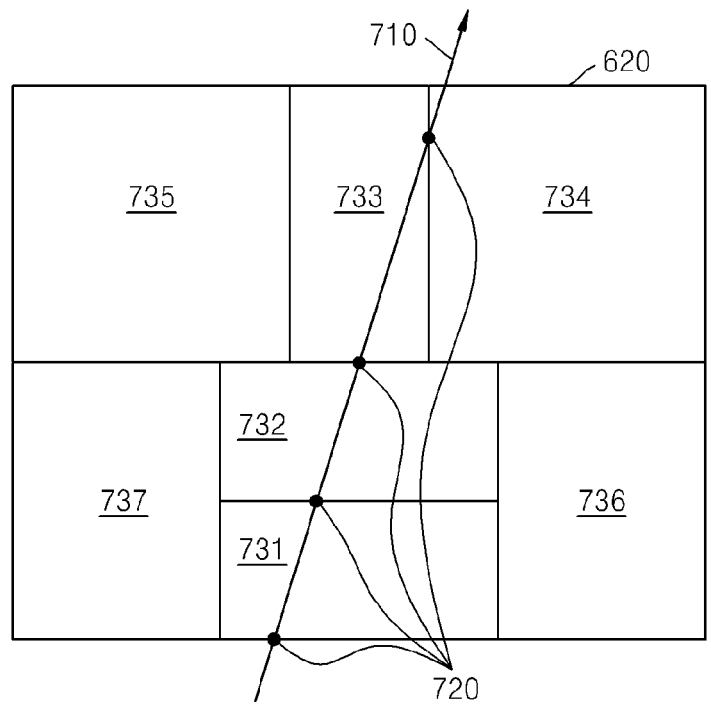
FIG. 7A is a diagram illustrating a process of predetermining how to perform sampling of volume data, based on a reference table, performed by the volume rendering apparatus of FIG. 2, according to an exemplary embodiment.

FIG. 7A is a diagram illustrating a process of predetermining how to perform sampling of volume data, based on a reference table, according to an exemplary embodiment. According to an exemplary embodiment, the determiner 120 determines how to perform sampling of non-uniform volume data, based on a reference table 620. In this case, the determiner 120 may determine sampling intervals, a direction vector 710 indicating a direction in which a ray goes ahead within the volume data, an order of sub-volumes to be sampled, entry points 720 of the sub-volumes at which the ray respectively enters the sub-volumes, sampling points, and so on, based on the reference table 620.

The determiner 120 may determine the direction vector 710 indicating a direction in which a ray passing through each of pixels on a projection plane from a viewpoint goes ahead within the volume data, and include the direction vector 710 into the reference table 620.

Also, the determiner 120 may determine an order in which the ray passes through the sub-volumes in the path of the ray, based on the reference table 620. In this case, the order means an order of the sub-volumes through which the ray passes in the direction indicated by the direction vector 710. Referring to FIG. 7A, the order of the sub-volumes may be determined in an order of a sub-volume 731, a sub-volume 732, a sub-volume 733, and a sub-volume 734.

Furthermore, the determiner 120 may further determine the entry points 720 at which the ray respectively enters the sub-volumes in the path of the ray, based on the reference table 620. The entry points 720 are points at which the ray first enters the sub-volumes, respectively. Referring to FIG. 7A, the entry points 720 may be points at which the ray first enters the sub-volumes 731, 732, 733, and 734 through which the ray passes.

Figure 7B:
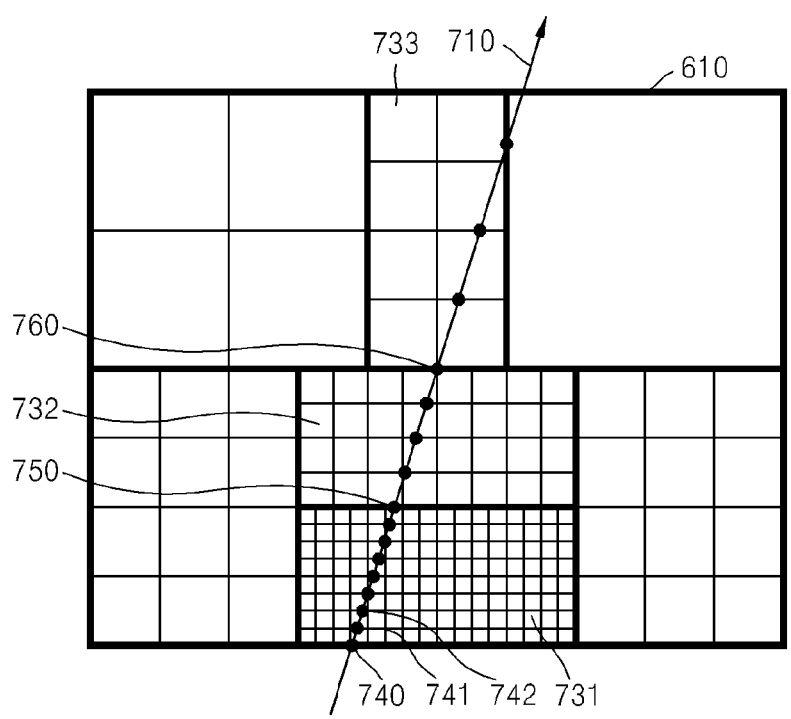
FIG. 7B is a diagram illustrating a process of sampling non-uniform volume data, based on the method predetermined in the process of FIG. 7A and the reference table, performed by the volume rendering apparatus of FIG. 1, according to an exemplary embodiment.

FIG. 7B is a diagram illustrating a process of sampling non-uniform volume data, based on the method predetermined in the process of FIG. 7A and the reference table, performed by the volume rendering apparatus, according to an exemplary embodiment.

The sampler 130 performs sampling, based on sampling intervals for sub-volumes determined by the determiner 120 and the information matters predetermined using the reference table 620 of FIG. 6B. The sampler 130 performs sampling at sampling points determined according to the sampling intervals for the sub-volumes according to a direction vector 710 indicating a path of a ray.

The volume rendering apparatus may predetermine the sampling points by using the reference table 620. Thus, the volume rendering apparatus 100 may perform sampling at the predetermined sampling points.

Referring to FIGS. 7A and 7B, the sampling points may be determined to be respectively disposed apart at a predetermined interval in the path of the ray starting from the entry points at which the ray enters the corresponding sub-volumes. The predetermined interval may be determined according to the sampling interval determined for each of the sub-volumes. As illustrated in FIG. 7B, the first sampling of the sub-volume 731 starts at the entry point 740 at which the ray enters the sub-volume 731 and extends to the point 741. The second sampling of the sub-volume 731 starts at the point 741 and extends to the point 742. As illustrated, the sampling points of the sub-volume 731 are disposed along the direction vector 710 in relatively short intervals before reaching the sub-volume 732. Each sampling of the sub-volume 732 extends along the direction vector 710 at the intervals which are longer than those of the sub-volume 731 starting from the entry point 750. Each sampling of the sub-volume 733 extends along the direction vector 710 at the intervals which are longer than those of the sub-volume 733 starting from the entry point 760. As described above, the size of the sampling interval may be determined according to the corresponding resolution level for each of the sub-volumes based on the reference table 620. Thus, sub-volumes with the higher resolution have shorter sampling intervals than the sub-volumes with the lower resolution.

Figure 8:
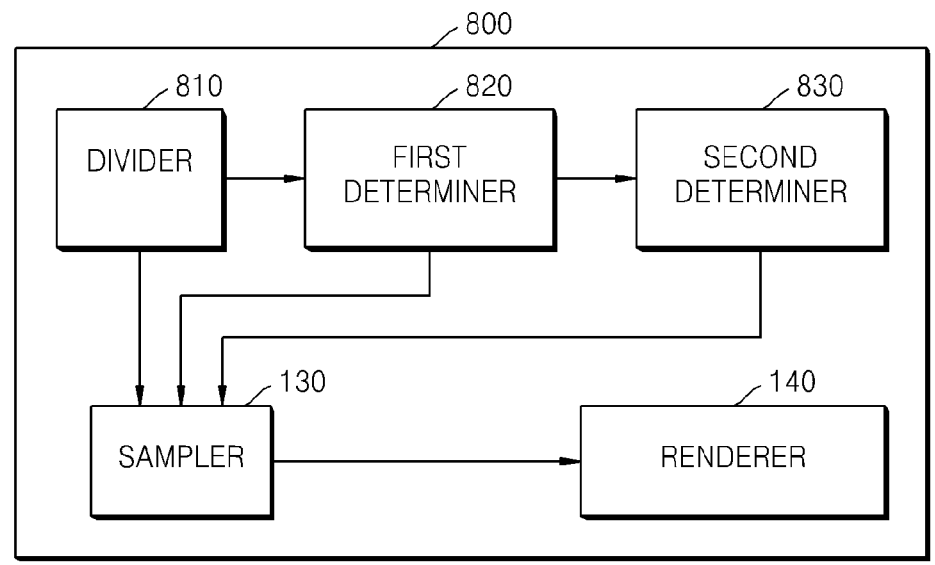
FIG. 8 is a block diagram of a volume rendering apparatus according to another exemplary embodiment.

FIG. 8 is a block diagram of a volume rendering apparatus 800 according to another exemplary embodiment. Referring to FIG. 8, the volume rendering apparatus 800 includes a divider 810, a first determiner 820, a second determiner 830, a sampler 130, and a renderer 140. The sampler 130 and the renderer 140 of FIG. 8 correspond to the sampler 130 and the renderer 140, respectively, and are not described again in detail.

For convenience of explanation, only elements of the volume rendering apparatus 800 that are related to an exemplary embodiment are illustrated in FIG. 8. Thus, the volume rendering apparatus 800 may further include other elements.

The divider 810 divides volume data into a plurality of sub-volumes according to the distance between the volume data and a viewpoint. For example, pieces of the volume data, which are present within a predetermined range of distance from the viewpoint, may be grouped as one sub-volume.

For example, the distance between the volume data and the viewpoint may be divided into a plurality of levels according to a predetermined criterion, and the volume data may be divided into a plurality of sub-volumes by grouping pieces of the volume data having the same level as one sub-volume.

The first determiner 820 determines resolution levels of the plurality of sub-volumes according to the distances between the plurality of sub-volumes and the viewpoint. For example, the shorter the distance between a sub-volume and the viewpoint, the higher the resolution level of the sub-volume may have.

In other words, volume data closer to the viewpoint may be determined to have a higher resolution level, and volume data farther from the viewpoint may be determined to have a lower resolution level. Thus, the volume data may be rendered so that volume data closer to the viewpoint may be determined to have a higher resolution and volume data farther from the viewpoint may be determined to be a lower resolution (see FIGS. 9A and 9B for more details).

The second determiner 830 determines a sampling interval for each of the plurality of sub-volumes, based on the resolution levels determined by the first determiner 820.

For example, the second determiner 830 may determine a sampling interval for each of the plurality of sub-volumes so that a sub-volume having a higher resolution level may have a shorter sampling interval and a sub-volume having a lower resolution level may have a longer sampling interval. Thus, the second determiner 830 determines the sampling intervals according to the distances between the volume data and the viewpoint to render the volume data.

The sampler 130 performs sampling on sub-volumes present in a path of a ray passing through each of pixels on a projection plane onto which the volume data is projected from one viewpoint, according to the sampling intervals determined by the second determiner 830, as described above with reference to FIGS. 1 and 2. Thus, the ray passing through each of the pixels travels within the volume data in a predetermined path to perform sampling, thereby obtaining sampling values.

The sampling values obtained through the sampling of the sampler 130 may include density values, color values, opacity, and intensity of light of the volume data in a 3D space.

The renderer 140 obtains a rendering value of each of the pixels on the projection plane by synthesizing sampling values corresponding to each of the pixels on the projection plane from among the sampling values obtained through the sampling of the sampler 130.

The renderer 140 synthesizes a plurality of sampling values corresponding to one of the pixels and obtains a rendering value corresponding to the pixel. Thus, the renderer 140 respectively obtains rendering values of all of the pixels on the projection plane by using the sampling values received from the sampler 130. The rendering values form a 2D image onto which the volume data, which is 3D data, is projected.

According to another exemplary embodiment, the volume rendering apparatus 800 performs volume rendering on the volume data to have multi-resolution by determining resolution levels according to the distance between the volume data and the viewpoint. In this case, the volume rendering apparatus 800 renders the volume data having multi-resolution according to the distance between the volume data and the viewpoint and may employ an adaptive level of detail (LOD) method to perform volume rendering on the volume data.

According to an exemplary embodiment, the volume rendering apparatus 800 renders non-uniform volume data by varying a resolution according to a distance between the volume data and a viewpoint. Thus, the volume rendering apparatus 800 may perform rendering so that volume data closer to the viewpoint may have a higher resolution and volume data farther from the viewpoint may have a lower resolution.

Figure 9A:
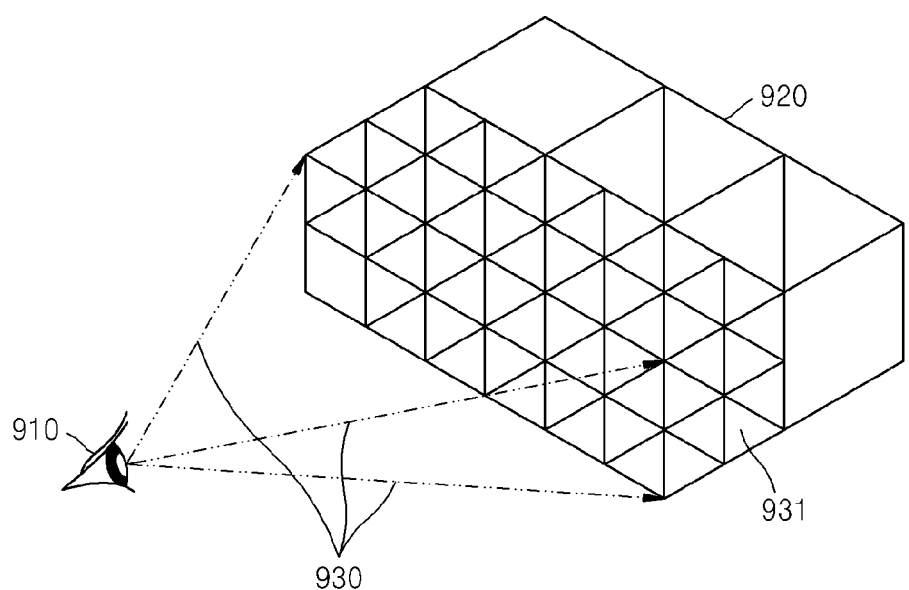
FIG. 9A is a diagram illustrating a process of performing volume rendering by varying resolution levels according to a distance between volume data and a viewpoint, performed by a volume rendering apparatus, according to another exemplary embodiment.
Figure 9B:
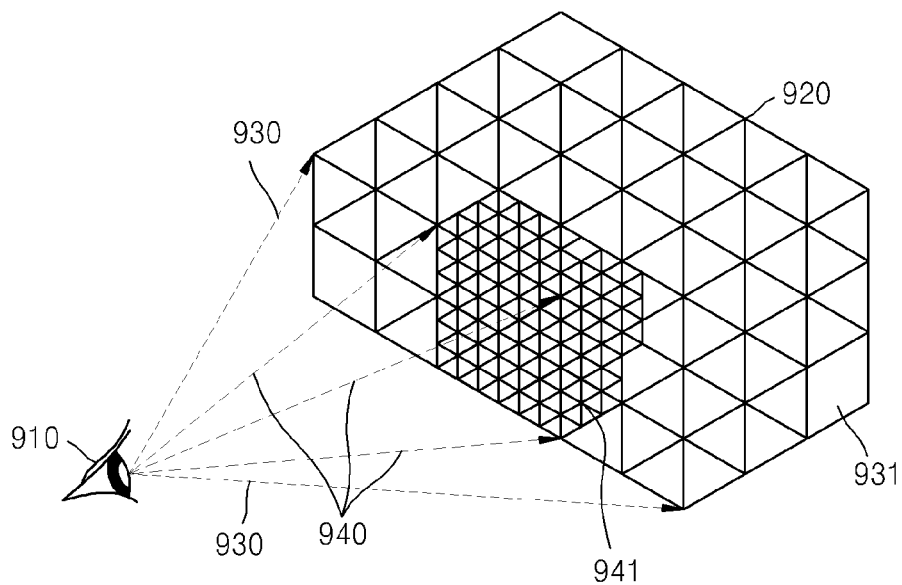
FIG. 9B is a diagram illustrating a process of performing volume rendering by varying resolution levels according to a distance between volume data and a viewpoint, performed by a volume rendering apparatus, according to another exemplary embodiment.

FIG. 9A is a diagram illustrating a process of performing volume rendering by varying resolution levels according to a distance between volume data and a viewpoint, performed by using a volume rendering apparatus, according to another exemplary embodiment. FIG. 9B is a diagram illustrating a process of performing volume rendering by varying resolution levels according to a distance between volume data and a viewpoint, performed by a volume rendering apparatus, according to another exemplary embodiment.

Referring to FIGS. 9A and 9B, in the volume rendering apparatus 800 of FIG. 8, rays passing through each of pixels on a projection plane from a viewpoint 910 travel within volume data 920 to sample the volume data 920 at sampling intervals determined by the second determiner 830, thereby obtaining sampling values.

According to an exemplary embodiment, the volume rendering apparatus 800 performs volume rendering according to distances between the portions of the volume data 920 and the viewpoint 910. Specifically, the volume rendering apparatus 800 divides the volume data 920 into a plurality of sub-volumes according to the distances between the volume data 920 and the viewpoint 910, and respectively determines resolution levels of the plurality of sub-volumes based on distances between the plurality of sub-volumes and the viewpoint 910.

Thus, the volume data may be rendered so that volume data in sub-volumes 931 disposed at a longer distance 930 from the viewpoint 910 is determined to have a lower resolution level so that the volume data in these sub-volumes may be sampled at longer sampling intervals, as illustrated in FIG.

9A. The volume data in sub-volumes 941 disposed at a shorter distance 940 from the viewpoint 910 is determined to have a higher resolution level so that the volume data in these sub-volumes may be sampled at shorter sampling intervals, as illustrated in FIG. 9B.

Figure 10:
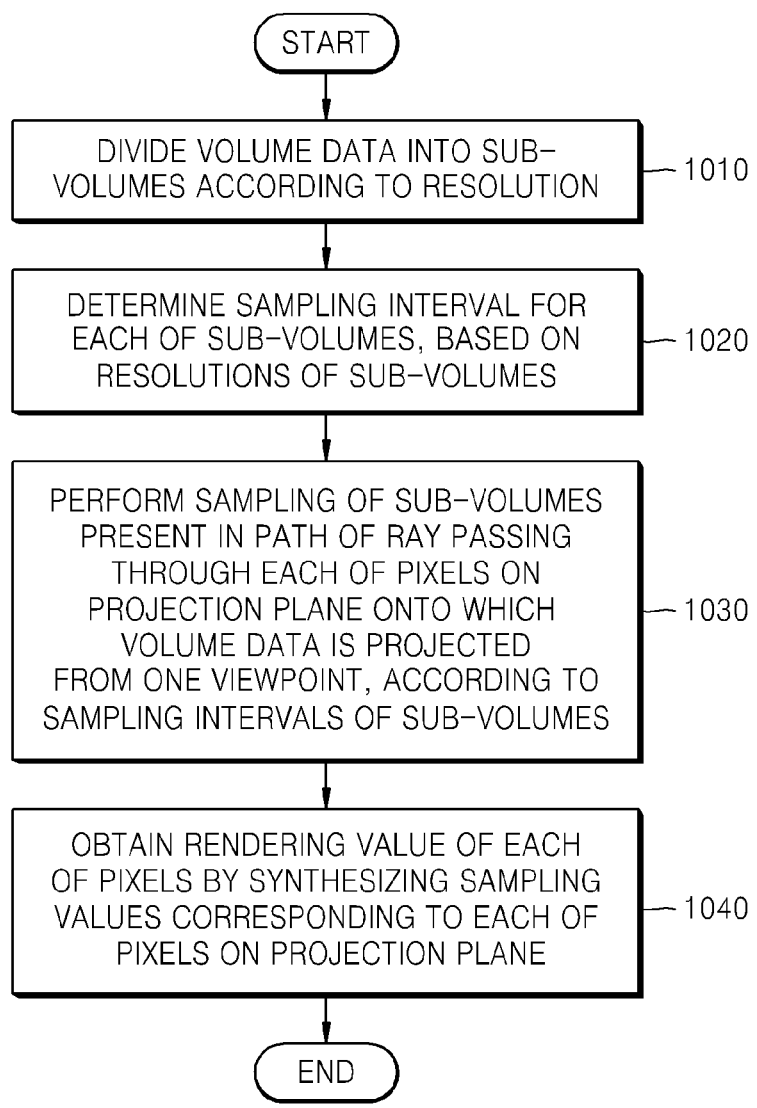
FIG. 10 is a flowchart illustrating a method of performing volume rendering on volume data, performed by a volume rendering apparatus, according to an exemplary embodiment.
Figure 11:
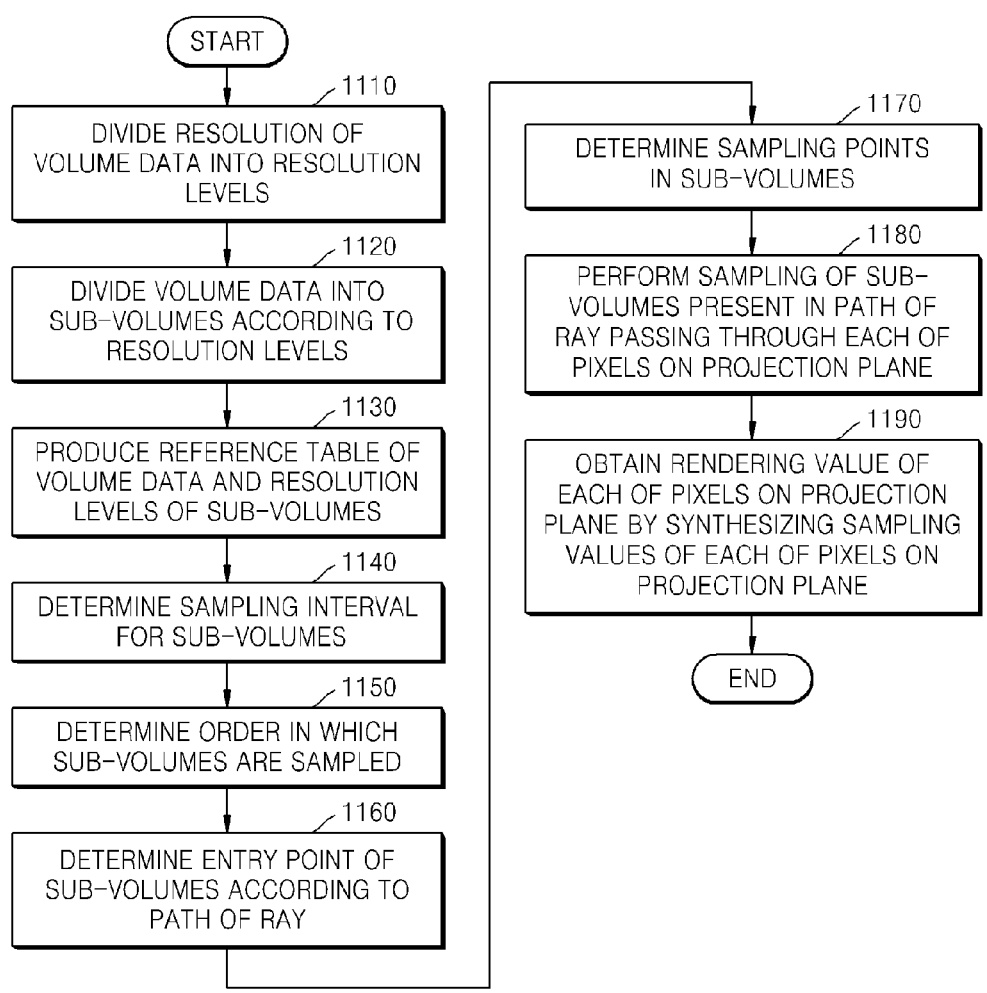
FIG. 11 is a flowchart illustrating a method of performing volume rendering on volume data, performed by a volume rendering apparatus, according to another exemplary embodiment.

FIGS. 10 to 12 are flowcharts illustrating various methods of performing volume rendering, performed by the volume rendering apparatuses of FIGS. 1, 2, and 8, according to exemplary embodiments. Each of the flowcharts of FIGS. 10 to 12 includes operations that are sequentially performed by the volume rendering apparatus 100 of FIG. 1, the volume rendering apparatus 200 of FIG. 2, or the volume rendering apparatus 800 of FIG. 8. Thus, although not described here, the above descriptions of the volume rendering apparatus 100 of FIG. 1, the volume rendering apparatus 200 of FIG. 2, or the volume rendering apparatus 800 of FIG. 8 may also be applied to the flowcharts of FIGS. 10 to 12.

FIG. 10 is a flowchart illustrating a method of performing volume rendering on volume data, performed by the volume rendering apparatus 100 of FIG. 1, according to an exemplary embodiment.

In operation 1010, the divider 110 divides volume data into a plurality of sub-volumes according to a resolution. Here, the volume data means volume data having multi-resolution. Thus, the divider 110 may divide volume data having multi-resolution into a plurality of sub-volumes according to the resolution of the volume data, based on a predetermined criterion.

In operation 1020, the determiner 120 determines sampling intervals for the plurality of sub-volumes, based on the resolutions of the plurality of sub-volumes, respectively. For example, the determiner 120 may determine a sub-volume having a higher resolution to have a shorter sampling interval and a sub-volume having a lower resolution to have a longer sampling interval.

In operation 1030, the sampler 130 performs sampling on sub-volumes present in a path of a ray passing through each of pixels on a projection plane onto which the volume data is projected from one viewpoint, according to the sampling intervals for the plurality of sub-volumes determined in operation 1020.

In operation 1040, the renderer 140 obtains a rendering value of each of the pixels by synthesizing a plurality of sampling values corresponding to each of the pixels on the projection plane from among sampling values obtained through the sampling performed in operation 1030.

According to an exemplary embodiment, the volume rendering apparatus 100 may directly render volume data having multi-resolution without having to transform the volume data having multi-resolution into volume data having the same resolution. Accordingly, it is possible to obtain a high-quality rendered image and also reduce a time and memory capacity needed for the rendering.

FIG. 11 is a flowchart illustrating a method of performing volume rendering on volume data, performed by the volume rendering apparatus 200 of FIG. 2, according to another exemplary embodiment. In operation 1110, the divider 110 divides a resolution of volume data into a plurality of resolution levels according to a predetermined criterion. Here, each of the resolution levels is a number indicating a resolution level within a predetermined range of resolution. A plurality of resolution levels may be determined in consideration of the overall resolution of the volume data having multi-resolution.

In operation 1120, the divider 110 divides the volume data into a plurality of sub-volumes each having the same resolution level, based on the resolution levels determined in operation 1110. Thus, the volume data in each of the plurality of sub-volumes is assumed to have the same resolution.

In operation 1130, the reference table generator 210 produces a reference table including a grid structure of the volume data divided in operation 1120 and the resolution levels of the plurality of sub-volumes. Thus, the volume rendering apparatus 200 may perform volume rendering on the volume data having multi-resolution by using the reference table.

In operation 1140, the determiner 120 determines a sampling interval for each of the plurality of sub-volumes by using the reference table produced in operation 1130.

In operation 1150, the determiner 120 determines an order of the plurality of sub-volumes to be sampled according to a path of a ray, based on the reference table.

In operation 1160, the determiner 120 determines an entry point of each of the plurality of sub-volumes according to the path of the ray by using the reference table.

In operation 1170, the determiner 120 determines sampling points according to the path of the ray by using the reference table and the sampling intervals determined in operation 1140.

In operation 1180, the sampler 130 performs sampling on sub-volumes present in the path of the ray passing through each of pixels on a projection plane onto which the volume data is projected, based on the sampling intervals, the order, the entry points, and sampling points determined in operations 1140 to 1170, and the reference table.

In operation 1190, the renderer 140 obtains a rendering value of each of the pixels on the projection plane by synthesizing a plurality of sampling values of each of the pixels on the projection plane from among sampling values obtained through the sampling performed in operation 1180.

According to an exemplary embodiment, the volume rendering apparatus 200 may perform volume rendering on volume data having multi-resolution, based on the grid structure of the volume data and the resolution levels of the plurality of sub-volumes. Thus, the volume rendering apparatus 200 may directly perform volume rendering on non-uniform volume data without having to reconstruct the volume data to have the same resolution. Accordingly, the volume rendering apparatus 200 may rapidly produce a high-quality image visualizing the inside of a 3D object or 3D semi-transparent materials.

FIG. 12 is a flowchart illustrating a method of performing volume rendering on volume data, performed by the volume rendering apparatus 800 of FIG. 8, according to an exemplary embodiment. In operation 1210, the divider 810 divides volume data into a plurality of sub-volumes according to a distance between the volume data and a viewpoint. For example, the divider 810 may group pieces of the volume data that are disposed by a predetermined distance from the viewpoint, as one sub-volume.

In operation 1220, the first determiner 820 determines resolution levels of the plurality of sub-volumes according to the distances between the plurality of sub-volumes and the viewpoint. For example, the first determiner 820 may determine the resolution levels so that the shorter the distance between a sub-volume and the viewpoint, the higher the resolution level of the sub-volume may be.

In operation 1230, the second determiner 830 determines a sampling interval for each of the plurality of sub-volumes, based on the resolution levels determined in operation 1220. For example, the second determiner 830 may determine sampling intervals so that the higher the resolution level of a sub-volume, the shorter the sampling interval for the sub-volume may be.

In operation 1240, the sampler 130 performs sampling on sub-volumes present in a path of a ray passing through each of pixels on a projection plane onto which the volume data is projected from one viewpoint, according to the sampling intervals determined in operation 1230.

In operation 1250, the renderer 140 obtains a rendering value of each of the pixels on the projection plane by synthesizing a plurality of sampling values corresponding to each of the pixels on the projection plane from among sampling values obtained through the sampling performed in operation 1240.

According to an exemplary embodiment, the volume rendering apparatus 800 renders non-uniform volume data by varying a resolution according to the distance between the volume data and a viewpoint. Thus, the volume rendering apparatus 800 may perform rendering so that volume data closer to the viewpoint may have a higher resolution and volume data farther from the viewpoint may have a lower resolution. Thus, with the volume rendering apparatus 800, it is possible to rapidly perform volume rendering on non-uniform volume data without having to increase the number of calculations for the rendering, and produce a high-quality rendered image.

As described above, according to one or more of the exemplary embodiments, it is possible to directly perform volume rendering on 3D volume data having multi-resolution without having to reconstruct the 3D volume data to have the same resolution.

Accordingly, it is possible to produce a high-quality rendered image and also efficiently and rapidly perform volume rendering without having to increase the number of calculations for volume rendering.

The above-described exemplary embodiments may be embodied as a computer program that can be executed by a computer. The computer program may be stored in a computer-readable recording medium, and executed using a general digital computer. Examples of the computer-readable medium are a magnetic recording medium (a ROM, a floppy disc, a hard disc, etc.), and an optical recording medium (a CD-ROM, a DVD, etc.).

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of rendering volume data having multi-resolution, the method comprising:
   dividing the volume data into a plurality of sub-volumes according to a resolution;
   producing a reference table including a grid structure of the volume data and resolution levels of the plurality of sub-volumes;
   determining a sampling interval for each of the plurality of sub-volumes, based on respective resolutions of the plurality of sub-volumes, by using the reference table; and
   sampling sub-volumes present in a path of a ray passing through a pixel on a projection plane onto which the volume data is projected from one viewpoint, according to the determined sampling intervals.

2. The method of claim 1, wherein the dividing the volume data comprises dividing a resolution of the volume data into a plurality of resolution levels according to a predetermined criterion, and
   dividing the volume data into the plurality of sub-volumes each having the same resolution level.

3. The method of claim 1, wherein the determining the sampling intervals further comprises determining an entry point of each of the plurality of sub-volumes according to the path of the ray by using the reference table, and
   the sampling the sub-volumes present in the path of the ray comprises sampling the sub-volumes present in the path of the ray according to the sampling intervals, based on the reference table and the entry point of each of the plurality of sub-volumes.

4. The method of claim 1, wherein the determining the sampling intervals further comprises determining an order in which the plurality of sub-volumes are sampled according to the path of the ray by using the reference table, and
   the sampling the sub-volumes present in the path of the ray comprises respectively sampling the sub-volumes in the order, according to the sampling intervals.

5. The method of claim 1, wherein the determining the sampling intervals further comprises determining sampling points according to the path of the ray by using the reference table and the sampling intervals for the plurality of sub-volumes, and
   the sampling the sub-volumes present in the path of the ray comprises respectively sampling the sub-volumes at the sampling points.

6. The method of claim 1, further comprising obtaining a rendering value of each of the pixels on the projection plane by synthesizing a plurality of sampling values corresponding to each of the pixels on the projection plane from among sampling values obtained through the sampling.

7. The method of claim 6, further comprising: displaying a two-dimensional image by using rendered values of the pixels.

8. The method of claim 1, wherein the dividing the volume data comprises grouping various resolutions present in the volume data into n resolution levels being greater than 1; and
   dividing the volume data into the plurality of sub-volumes each having the same resolution level.

9. A method of rendering volume data, the method comprising:
   dividing volume data into a plurality of sub-volumes according to distances between portions of the volume data and a viewpoint;
   determining resolution levels of the plurality of sub-volumes according to the distances between the plurality of sub-volumes and the viewpoint;
   producing a reference table including a grid structure of the volume data and the resolution levels of the plurality of sub-volumes;
   determining a sampling interval for each of the plurality of sub-volumes, based on the resolution levels, by using the reference table; and
   sampling sub-volumes present in a path of a ray passing through a pixel on a projection plane onto which the volume data is projected from the viewpoint, according to the sampling interval for each of the plurality of sub-volumes.

10. The method of claim 9, wherein the determining the resolution levels of the plurality of sub-volumes comprises determining the resolution levels so that the sub-volumes disposed at shorter distances from the viewpoint have resolution levels that are higher than resolution levels of the sub-volumes disposed at longer distances from the viewpoint.

11. A non-transitory computer-readable recording medium having recorded thereon a computer program for executing the method of claim 1.

12. A rendering apparatus for rendering volume data having multi-resolution, the rendering apparatus comprising:

a non-transitory memory;

a processor operable to read the memory and operate as instructed by the memory to implement:

a divider which divides the volume data into a plurality of sub-volumes according to a resolution;

a reference table generator which produces a reference table including a grid structure of the volume data and resolution levels of the plurality of sub-volumes;

a determiner which determines a sampling interval for each of the plurality of sub-volumes, based on respective resolutions of the plurality of sub-volumes, by using the reference table;

a sampler which samples sub-volumes present in a path of a ray passing through a pixel on a projection plane onto which the volume data is projected from one viewpoint, according to the determined sampling intervals; and a renderer which obtains a rendering value of each of the pixels on the projection plane by synthesizing a plurality of sampling values corresponding to each of the pixels on the projection plane from among sampling values obtained through the sampling.

13. The rendering apparatus of claim 12, wherein the divider divides a resolution of the volume data into a plurality of resolution levels according to a predetermined criterion, and divides the volume data into the plurality of sub-volumes each having the same resolution level.

14. The rendering apparatus of claim 12, wherein the determiner determines an entry point of each of the plurality of sub-volumes according to the path of the ray by using the reference table, and the sampler respectively samples the sub-volumes present in the path of the ray according to the sampling intervals, based on the reference table and the entry point of each of the plurality of sub-volumes.

15. The rendering apparatus of claim 12, wherein the determiner further determines sampling points according to the path of the ray by using the reference table and the sampling intervals for the plurality of sub-volumes, and the sampler respectively samples the sub-volumes at the sampling points.

16. The rendering apparatus of claim 12, wherein the determiner determines an order in which the plurality of sub-volumes are sampled according to the path of the ray by using the reference table, and the sampler respectively samples the sub-volumes in the order according to the sampling intervals.

17. A rendering apparatus for rendering volume data, the rendering apparatus comprising:

a non-transitory memory;

a processor operable to read the memory and operate as instructed by the memory to implement:

a divider which divides volume data into a plurality of sub-volumes according to distances between portions of the volume data and a viewpoint;

a first determiner which determines resolution levels of the plurality of sub-volumes according to the distances between the plurality of sub-volumes and the viewpoint;

a reference table generator which produces a reference table including a grid structure of the volume data and the resolution levels of the plurality of sub-volumes;

a second determiner which determines a sampling interval for each of the plurality of sub-volumes, based on the resolution levels, by using the reference table;

a sampler which samples sub-volumes present in a path of a ray passing through a pixel on a projection plane onto which the volume data is projected from the viewpoint, according to the sampling interval for each of the plurality of sub-volumes; and a renderer which obtains a rendering value of each of the pixels on the projection plane by synthesizing a plurality of sampling values corresponding to each of the pixels on the projection plane from among sampling values obtained through the sampling.

18. The rendering apparatus of claim 17, wherein the first determiner determines the resolution levels so that the sub-volumes disposed at shorter distances from the viewpoint have higher resolution level than the sub-volumes disposed at greater distances from the viewpoint.

* * * * *